United States Patent
Yamada (10) Patent No.: US 6,721,240 B2
(45) Date of Patent: Apr. 13, 2004

(54) MASTER-OPTICAL-DISK PROCESSING METHOD AND MASTERING APPARATUS

(75) Inventor: Hideaki Yamada, Nagano-ken (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 09/214,993

(22) PCT Filed: May 15, 1998

(86) PCT No.: PCT/JP98/02174

§ 371 (c)(1),
(2), (4) Date: Jan. 13, 1999

(87) PCT Pub. No.: WO98/52192

PCT Pub. Date: Nov. 19, 1998

(65) Prior Publication Data

US 2002/0034133 A1 Mar. 21, 2002

(30) Foreign Application Priority Data

May 16, 1997 (JP) .............................................. 9-127694

(51) Int. Cl.[7] ................................................. G11B 7/00
(52) U.S. Cl. ................................ 369/44.11; 369/44.34; 369/275.4; 369/116
(58) Field of Search .......................... 369/44.11, 44.13, 369/275.4, 44.34, 116

(56) References Cited

U.S. PATENT DOCUMENTS

| | | | | |
|---|---|---|---|---|
| 5,043,965 A | * | 8/1991 | Iida et al. ................. | 369/44.13 |
| 5,270,991 A | * | 12/1993 | Verboom ................. | 369/44.26 |
| 5,404,345 A | * | 4/1995 | Taki ........................ | 369/44.26 |
| 5,416,298 A | * | 5/1995 | Roberts ....................... | 219/121 |
| 5,508,995 A | * | 4/1996 | Moriya et al. ............ | 369/275.4 |
| 5,646,766 A | * | 7/1997 | Conemac ................... | 359/204 |
| 5,680,381 A | * | 10/1997 | Horimai .................. | 369/500 R |
| 5,748,222 A | * | 5/1998 | Roberts ....................... | 346/241 |
| 5,859,820 A | * | 1/1999 | Nagasawa et al. ... | 369/275.3 X |
| 5,862,112 A | * | 1/1999 | Nagai et al. .......... | 369/275.3 X |
| 6,091,700 A | * | 7/2000 | Kobayashi ............... | 369/275.4 |
| 6,118,756 A | * | 9/2000 | Masuhara et al. ....... | 369/275.4 |

FOREIGN PATENT DOCUMENTS

| | | | |
|---|---|---|---|
| JP | 4-291060 | | 10/1992 |
| JP | 4-351729 | | 12/1992 |
| JP | 7-296426 | | 11/1995 |
| JP | 9-120569 | | 5/1997 |
| JP | 9-128783 | | 5/1997 |
| JP | 9-147366 | * | 6/1997 |
| JP | 9-274722 | | 10/1997 |
| JP | 9-320127 | | 12/1997 |
| JP | 11-96604 | * | 4/1999 |

OTHER PUBLICATIONS

English translation of JP 4–291060.*
Translation of JP 4–291060.*
Translation of JP 7–296426.*
Translation of JP 9–120569.*
Translation of JP 11–96604.*

* cited by examiner

*Primary Examiner*—Aristotelis M. Psitos
(74) *Attorney, Agent, or Firm*—Harness, Dickey & Pierce, P.L.C.

(57) ABSTRACT

A process for a master optical disk of the present invention is a process for a master optical disk having a physical format in which in a groove-and-prepits-included rewritable optical disk, prepits not being on spirals identical to those of a groove, for example, prepits shifted outward and inward by a half-track pitch from the groove center, are recorded, wherein an acoustooptic-effect-used optical deflector or a field-optical-effect-used optical deflector 101 is disposed on an optical path of a mastering apparatus so that a single laser beam is deflected. This process makes it possible to use a single processing scan to perform laser processing for a plurality of arbitrary points, for example, the center of the groove, and positions shifting inward and outward by a half-track pitch from the center.

4 Claims, 7 Drawing Sheets

MASTER-OPTICAL-DISK PROCESSING METHOD AND MASTERING APPARATUS

TECHNICAL FIELD

The present invention relates to steps for processing a master optical disk. In particular, it relates to a master-optical-disk processing method, a mastering apparatus provided with the function thereof, a master optical disk processed thereby, and optical disks produced based on the master disk.

BACKGROUND ART

In order that the use of a single processing scan may perform laser processing for a groove and prepits in a physical format in which in a land-and-groove-recording rewritable optical medium, the groove and a land are switched for each track, and the prepits (e.g., prepits shifted outward and inward by a half-track pitch from the groove center), which have no track-sector information on spirals identical to those of the groove, are used to enable the reading of the track-sector information on the land and the groove by performing a single processing scan, at least three laser beams are required. In other words, they are: (1) a laser beam for processing for the groove; (2) a laser beam for processing for the prepits shifted outward by a half-track pitch; and (3) a laser beam for processing for the prepits shifted inward by the same pitch. In addition, processing can be performed with two laser beams by setting a feed track pitch of a mastering apparatus in processing to be half of the track pitch in the physical format.

The above-described process using at least three laser beams to perform laser processing, as the background art, has problems in that the optical system of the mastering apparatus is large and complicated, and cancellation of laser beam interference is very difficult. The process performing laser processing, with a feed track pitch in a mastering apparatus set to be half of the track pitch in the physical format, has problems in that the processing time is doubled, and a processing signal generator is complicated.

Accordingly, the present invention is intended to solve the foregoing problems, and an object thereof is to provide a process that performs easy and efficient laser processing for a groove and prepits on one track on a master optical disk by a single processing scan, and a mastering apparatus provided with the function of the process.

SUMMARY OF THE INVENTION

A process for a master optical disk of the present invention has the following construction.

(1) A process for a master optical disk having a physical format in which in a land-and-groove-recording rewritable optical medium, a groove and a land are switched for each track, and prepits having no track-sector information on spirals identical to those of the groove are used to enable the reading of the track-sector information on the land and the groove by performing a single processing scan, wherein the prepits for the track-sector information, and an optical deflector using acoustooptic effects or an optical deflector using field-optical effects, are used to perform the optical deflection of a laser beam used for processing, and the use of a single processing scan performs laser processing for the groove and the prepits on one track.

(2) A process for a master optical disk having not only a physical format as set forth in (1) above but also a physical format in which a groove is wobbled at a frequency in a phase identical to that of an adjacent track, wherein the process comprises: storing a signal for the wobbling as digital data in a read-only memory; outputting the digital data in synchronization with an original clock signal for generating a process-for-prepits signal and a process-for-groove signal; applying to an optical deflector a composite signal of a wobbling signal generated by performing phase correction, and a signal for deflecting a laser beam inward and outward by a half-track pitch from the center of the groove; and using optical deflection based on the composite signal to perform laser processing for the groove and the prepits on one track by a single processing scan.

In addition, preferred embodiments in which the above-described process for a master optical disk is applied are shown below.

(a) A mastering apparatus provided with process (1) for a master optical disk.
(b) A mastering apparatus provided with process (2) for a master optical disk.
(c) A master optical disk processed by using mastering apparatus (a) or (b), and optical disks manufactured based on the master optical disk.

DETAILED DESCRIPTION OF THE PREFERRED EMBODIMENTS

An embodiment of the present invention will be described below based on the drawings.

Figure 1:
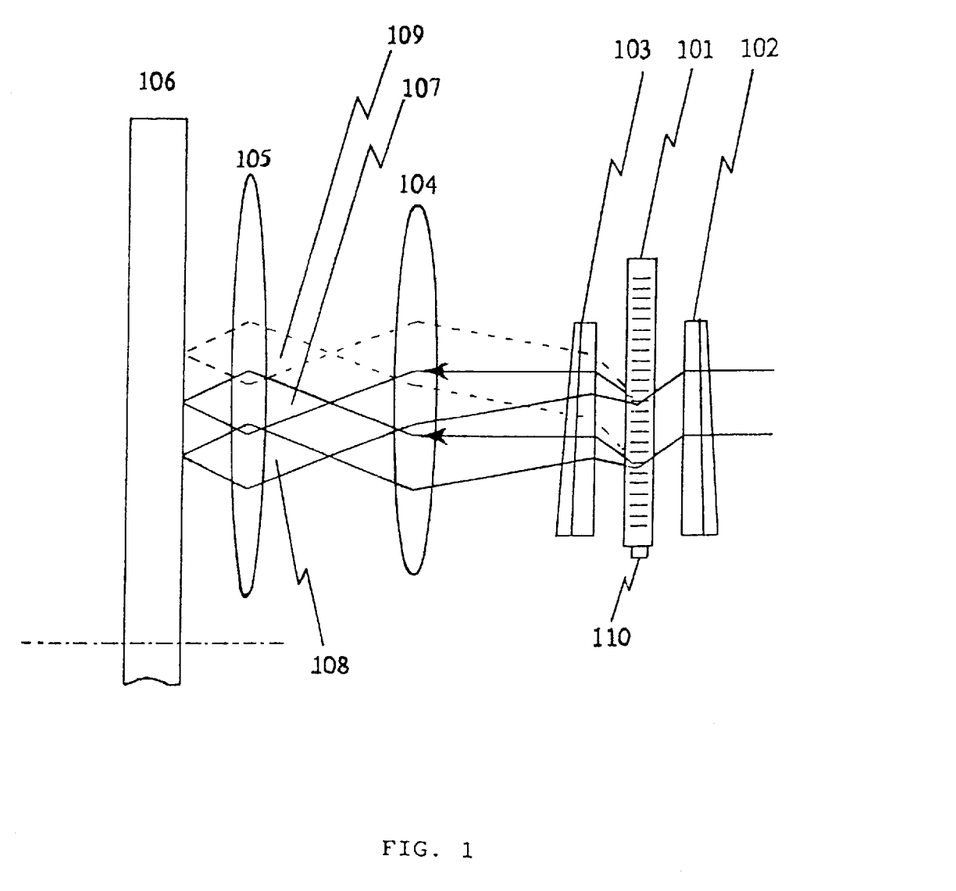
FIG. 1 is a schematic view showing optical paths in a process for a master optical disk according to an embodiment of the present invention.

FIG. 1 is a drawing showing optical paths in a master optical disk according to the embodiment of the present invention. The drawing shows a construction in which an acoustooptic deflector 101 is used for laser-beam deflection for shifting a prepit group: that is, (1) a wedged cylindrical lens 102 having both the function of providing the acoustooptic deflector 101 with an incident angle (Bragg angle) and the function of stopping itself down in only the horizontal direction; (2) a wedged cylindrical lens 103 for restoring the incident angle of and recollimating light having passed through the acoustooptic deflector 101; and (3) a light deflection unit including the acoustooptic deflector 101. These components are used to perform laser beam deflection. Deflected laser beams 107, 108, and 109, are converged by an intermediate lens 104 and an objective lens 105 so as to form an image on a master glass disk 106. The acoustooptic deflector 101 can control an emergent deflection angle by using an acoustic wave frequency applied from a transducer 110. Accordingly, when an acoustic wave having a central transmission frequency of the acoustooptic deflector 101 is applied from the acoustooptic deflector 101 to its crystals, the light deflection unit is adjusted so that the incident to the acoustooptic deflector 101 is equal to the emergent angle. Therefore, when the central transmission frequency is applied to the acoustooptic deflector 101, the laser beam 107 travels through its optical path. Accordingly, using the laser beam 107 performs laser processing for grooves in, for example, a physical format (hereinafter referred to as a "first physical format") in which a groove and a land are switched for each track, and prepits having no track-sector information on spirals identical to those of the groove are used to enable the reading of the track-sector information on the land and the groove by performing a single processing scan, or a physical format (hereinafter referred to as a "second physical format") in which the groove is wobbled at a frequency in a phase identical to that of an adjacent track.

A group of prepits recorded a half-track pitch outer in periphery than the center of a groove in the first physical format or the second physical format is referred to, for example, ID1 or ID2. In the case where a group of prepits recorded in the same inner periphery is referred to, for example, ID3 or ID4, by setting the acoustic wave frequency applied from the transducer 110 to the crystals of the acoustooptic deflector 101 so as to be higher than the central transmission frequency of the acoustooptic deflector 101, the optical path of the laser beam 109 is used. Accordingly, by using the laser beam 109, laser processing for ID1 or ID2 recorded outward by a half-track pitch from the groove center is performed. In addition, by setting the acoustic wave frequency from the trnsducer 110 to the crystals of the acoustooptic deflector 101 so as to be lower than the central transmission frequency of the acoustooptic deflector 101, the optical path of the laser beam 108 is used. Therefore, by using the laser beam 108, laser processing for ID3 or ID4 recorded inward by a half-track pitch from the groove center is performed. Since the objective lens 105 is shown with a finite-focus optical system in this embodiment, the intermediate lens 104 is used, but if the objective lens 105 is an infinite-focus optical system, the need for the intermediate lens 104 is eliminated, and a modification of an optical deflection unit including the wedged cylindrical lenses 102 and 103 is particularly not required. If the construction of the optical deflection unit is changed to a field-optical deflector, only a modification of control method is required, and the above-described function is sufficiently achieved. At this time, it is required that an incident laser beam on the field optical deflector be collimated to be adapted for the field optical deflector.

Next, the control method is described with the drawings.

Figure 2:
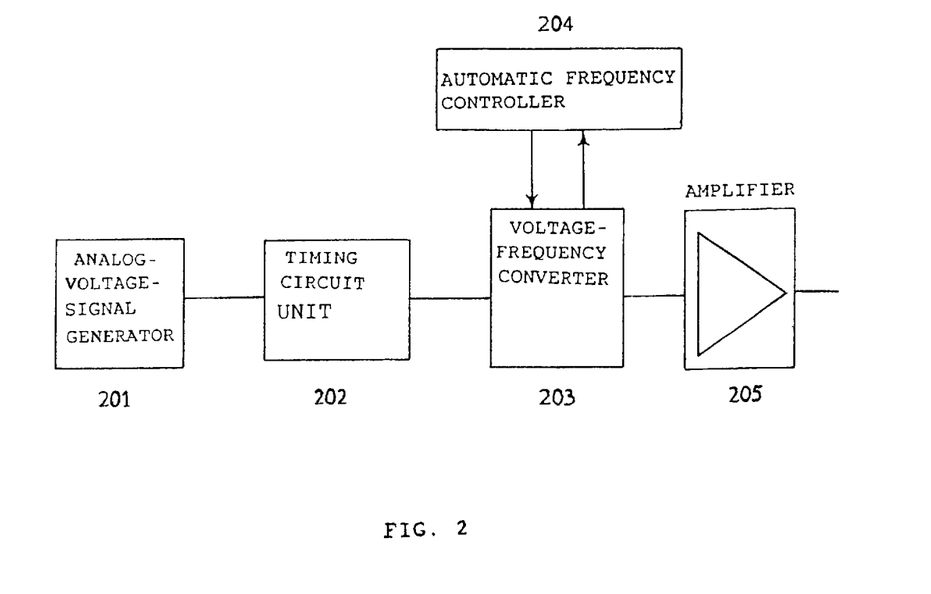
FIG. 2 is a block diagram showing one example of control when an acoustooptic deflector is used.

FIG. 2 is a drawing showing one example of the control method obtained when the acoustooptic deflector 101 is used as the optical deflector. In order that the first physical format may be satisfied, a signal applied to the transducer 110 is generated by a combination of an analog-voltage-signal generator 201, a timing-circuit unit 202, a voltage-frequency converter 203, an automatic frequency controller 204, and an amplifier 205. The analog-voltage-signal generator 201 detects each of a process-for-groove signal and a process-for-prepit-group signal about ID1 or ID2, and ID3 or ID4, and outputs, as a voltage analog signal, the relative position of each laser-beam imaging, namely, a laser-beam deflection. The timing-circuit unit 202 has the function of adjusting the timing of each signal generated by the analog-voltage-signal generator 201 in consideration of a displacement time required for the acoustooptic deflector to perform laser deflection, for example, a switching period from process-for-groove signal 303 to ID1/ID2-process-for-prepits signal 304, a switching period from ID1/ID2-process-for-prepits signal 304 to ID3/ID4-process-for-prepits signal 305, a switching period from ID3/ID4-process-for-prepits signal 305 to groove-processing signal 303, and a delay time until sound waves emitted from the transducer 110 interact with the laser beam. By using the adjustment function, problems are solved in which the trailing end of a groove or prepit formed at switching timing for the processing signal trails on toward the next shifted groove or prepit, and the leading end of a groove or prepit processed at the timing trails on toward a groove or prepit formed before it is shifted. In addition to the prevention of the problems, the timing-circuit unit 202 has the function of generating a groove-wobbling signal for satisfying the second physical format, in which the groove is wobbled at a frequency with a phase identical to that of an adjacent track, and the function of correcting the groove-wobbling signal. The voltage-frequency converter 203 has the function of converting the analog voltage signal based on the laser-beam deflection, from the timing-circuit unit 202, into a frequency signal based on the voltage. At this time, at the central value of the analog voltage signal output from the timing-circuit unit 202, that is, zero volts, by adjusting the output signal frequency from the voltage-frequency converter 203 so as to be the central transmission frequency of the acoustooptic deflector 101, control is facilitated. The automatic frequency controller 204 has the function of suppressing a factor other than a laser-beam deflection signal for shifting the prepits outward or inward by, for example, a half-track pitch, such as ID1/ID2 and ID3/ID4, and a signal for wobbling the groove at a frequency, that is, the average frequency applied to the transducer 110 in the acoustooptic deflector 101 changes due to a temperature drift, etc., with respect to the central frequency of the acoustooptic deflector 101. The automatic frequency controller 204 detects the signal frequency output by the voltage-frequency converter 203, and always performs feedback to the voltage-frequency converter 203 so that the average frequency of the signal frequency matches the central transmission frequency of the acoustooptic deflector 101. The amplifier 205 has the function of converting the signal output from the voltage-frequency converter 203 into a signal level capable of driving the transducer 110 of the acoustooptic deflector 101.

Next, the operations of the analog-voltage-signal generator 201 and the voltage-frequency converter 203 are described based on the drawings.

Figure 3:
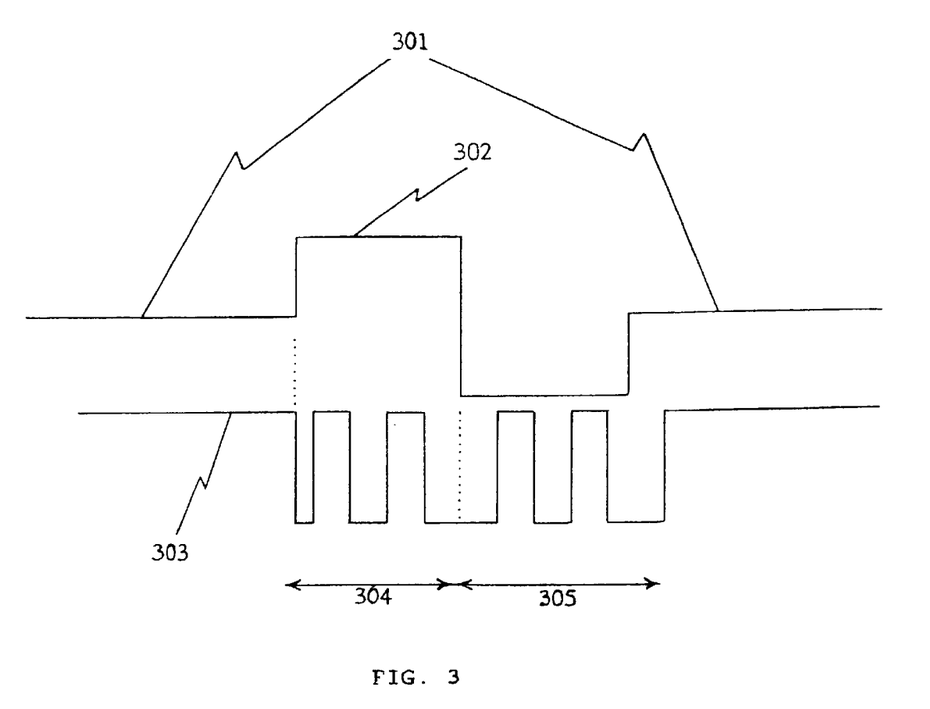
FIG. 3 is a chart showing signal waveforms generated by an analog-voltage-signal generator.

FIG. 3 is a drawing showing analog voltage signals 301 and 302, process-for-groove signal 303, ID1/ID2-process-for-prepits signal 304, and ID3/ID4-process-for-prepits signal 305, which are generated by the analog-voltage-signal generator 201 for laser-beam deflection. When process-for-groove signal 303 is output, the analog-voltage-signal generator 201 outputs stable zero volts. At the same time when process-for-groove signal 303 changes into its OFF condition, the analog-voltage-signal generator 201 outputs, for example, analog-voltage signal 302 non-linearly in the positive direction so that the laser beam is shifted a half track outer in periphery with respect to the center of the groove. Subsequently, ID1/ID2-process-for-prepits signal 304 is output. After finishing outputting ID1/ID2-process-for-prepits signal 304, the analog-voltage-signal generator 201 outputs, for example, analog voltage signal 302 non-linearly in the negative direction so that the laser beam is shifted to be a half-track pitch inner in periphery with respect to the center of the groove. Subsequently, ID3/ID4-process-for-prepits signal 305 is output. After finishing outputting ID3/ID4-process-for-prepits signal 305, the analog-voltage-signal generator 201 outputs stable zero volts again. Subsequently, process-for-groove signal 303 is output as a processing signal.

Next, the operation of the timing-circuit unit 202 is described based on the drawings.

Figure 4:
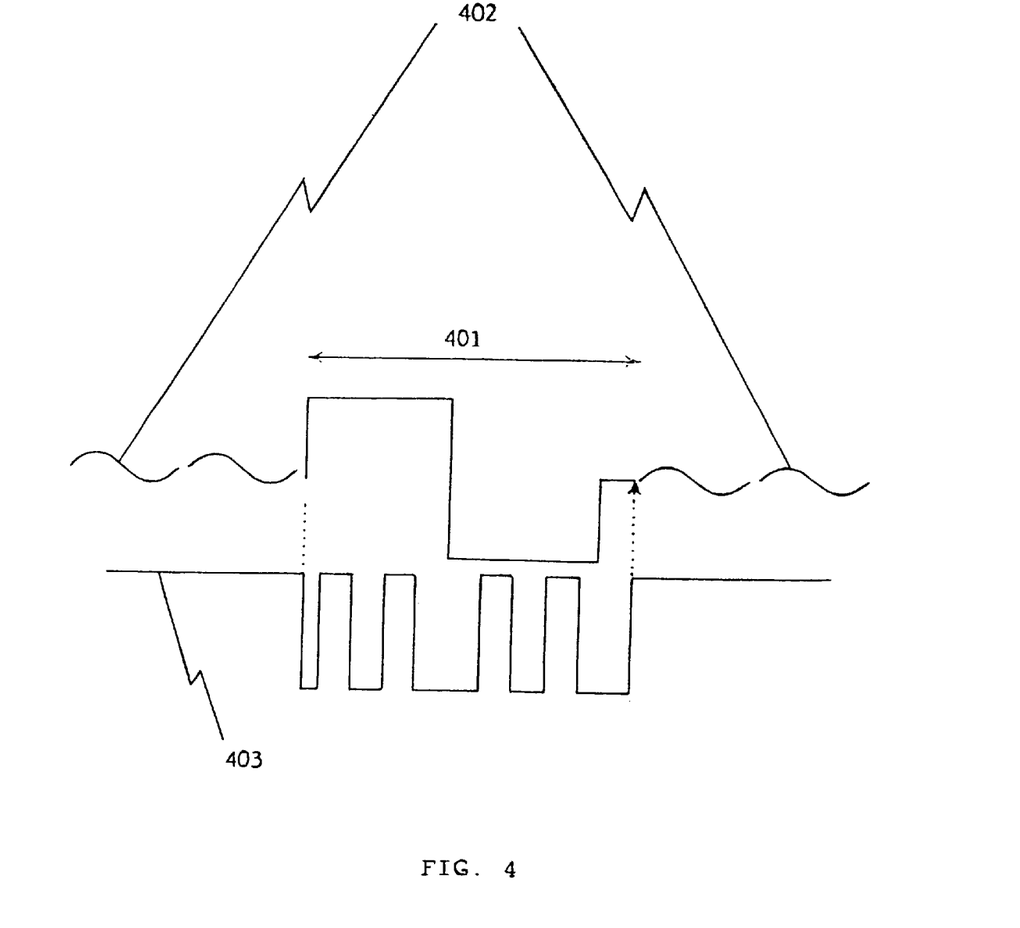
FIG. 4 is a chart showing signal waveforms generated by a circuit timing-circuit unit.
Figure 5:
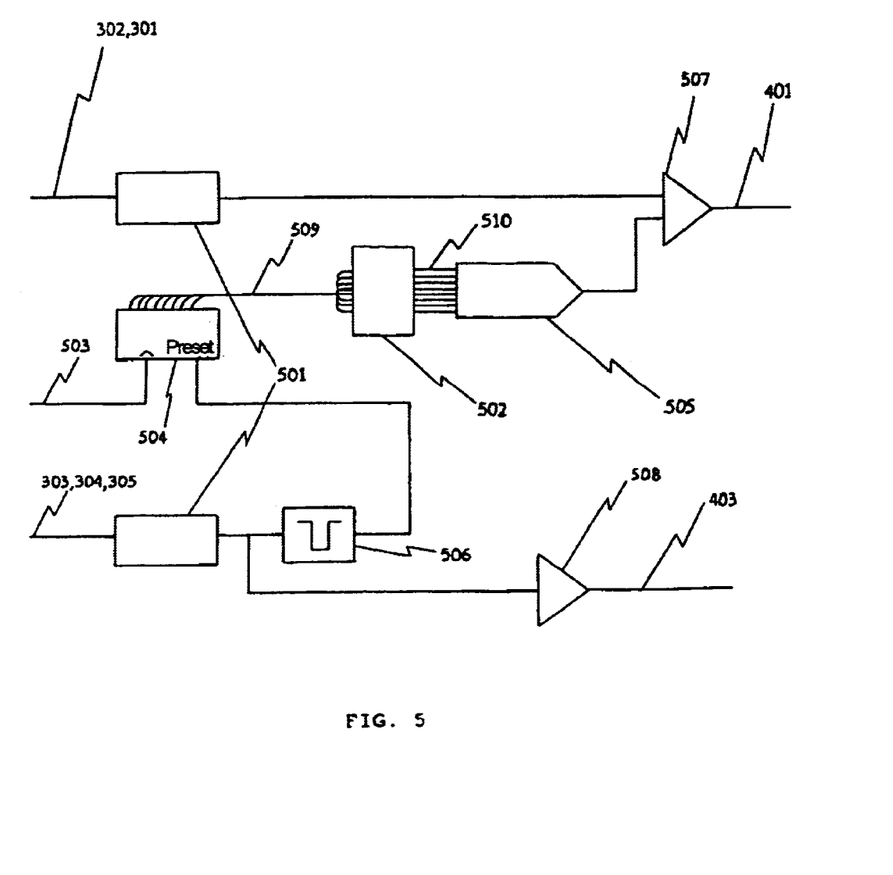
FIG. 5 is a diagram showing the structure of a timing-circuit unit.

FIG. 4 is a drawing showing signal 401 in which analog voltage signal 302 generated for laser-beam deflection by the analog-voltage-signal generator 201 is adjusted in timing, signal 402 for wobbling the groove at a frequency by using a phase identical to that of an adjacent track, and signal 403 in which process-for-groove signal 303, ID1/ID2-process-for-prepits signal 304, and ID3/ID4-process-for-prepits signal 305, are adjusted in timing. FIG. 5 is an example of a block diagram of the timing-circuit unit 202. The timing-circuit unit 202 includes a delay circuit unit 502 independent for each signal system so that the timings of the analog voltage signals 301 and 302, and process signals 303, 304, and 305, generated from the analog-voltage-signal generator 201, can be adjusted in consideration of the displacement time of the acoustooptic deflector 101, the switching periods among the process-for-groove signal 303, ID1/ID2- and ID3/ID4-process-for-prepits signals 304 and 305, and the delay time until the sound waves emitted from the transducer 110 interact with the laser beam. The storing wobble data in a wobble-data ROM 502 is performed as a means adapted for the second physical format. In order that timing for outputting the stored data may have a phase identical to that of an adjacent track in processing for the groove, ID1-, ID2-, ID3-, and ID4-process-for-prepits signals, and original clock signal 503, are used to drive a frequency-dividing-circuit unit 504. By using an original-clock-signal dividing signal output from the frequency-dividing-circuit unit 504 by means of an address bus 509, an address in the wobble-data ROM 502 is specified. Wobble data prestored at the specified address is output to a digital-to-analog converter 505 via a data bus 510. A groove-rising edge of process signal 403 in which the timing of process-for-groove signal 303 is adjusted by the delay circuit unit 501 is detected by a one-shot circuit unit 506, and a pulse signal output thereby presets the frequency-dividing-circuit unit 504. As a result, address zero in the wobble-data ROM 502 is specified. The analog wobble signal 402 is generated based on the wobble-data ROM 502 by the digital-to-analog converter 505. Thus, the analog wobble signal 402 in which a phase with respect to that of an adjacent track is corrected is output. For example, by setting the data at address zero in the wobble-data ROM 402 to start at a phase of zero degrees, the phase of the groove always starts at a phase of zero degrees. The analog wobble signal is generated by using an adder-circuit unit 507 and analog voltage signal 401 in which the timing of analog voltage signal 302 is adjusted by the delay circuit unit 501, and is converted to have an appropriate output level before being output to the voltage-frequency converter 203.

Next, the operation of the voltage-frequency converter 203 is described based on the drawing.

Figure 6:
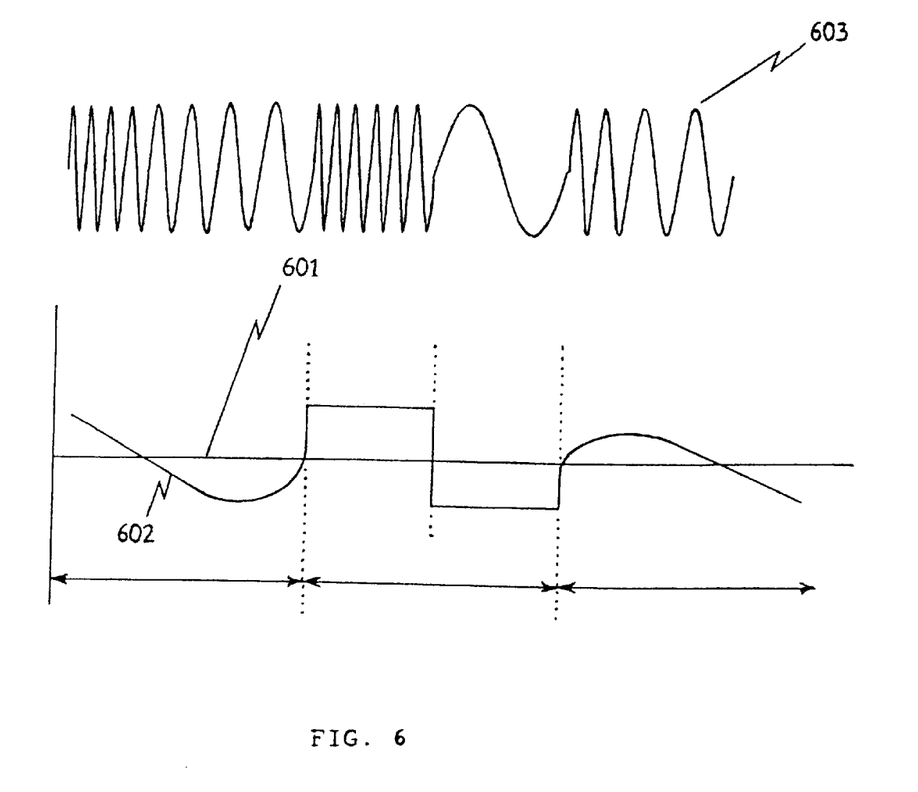
FIG. 6 is a chart showing waveforms generated by a voltage-frequency converter.
Figure 7:
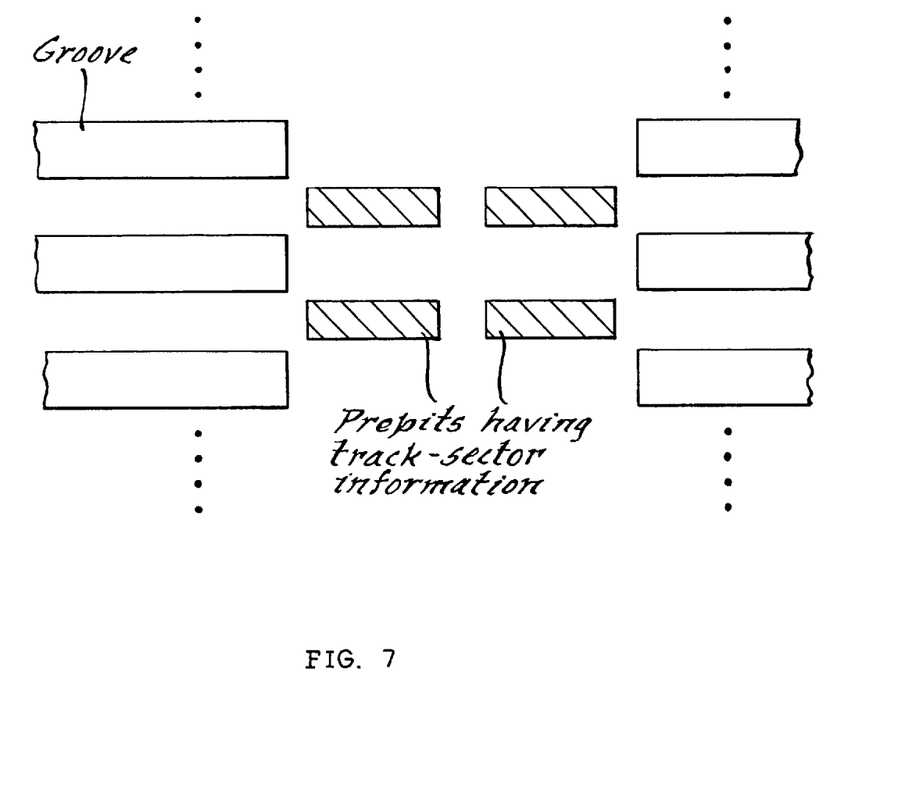
FIG. 7 shows prepits having track-section information not on spirals identical to the groove.

FIG. 6 shows analog voltage signal 602 for laser-beam deflection received by the voltage-frequency converter 203 from the timing-circuit unit 202, analog voltage signal 601 representing the central transmission frequency of the acoustooptic deflector 101, and frequency signal 603 frequency-converted based on analog voltage signal 602. The average frequency of frequency signal 603 is controlled by the automatic frequency controller 204 so as to match the central transmission frequency of the acoustooptic deflector 101. By adjusting analog voltage signal 601 representing the central transmission frequency of the acoustooptic deflector 101 to, for example, zero volts, an integral value of analog voltage signal 602 for laser-beam deflection is zero. Frequency-converted frequency signal 603 is converted by the amplifier 205 so as to have a signal level capable of driving the transducer 110. As described above, the acoustooptic deflector 101 uses a single deflected laser beam and a sigil processing scan, whereby a groove and a prepit group on one track can be formed in the first or second physical format.

In the case where a field optical deflector is used, the need for the function of the voltage-frequency converter 203 is eliminated. Instead, by way of example, by only connecting, after the timing-circuit unit 202, a driver for converting analog voltage signals 401 and 402 to have a signal level capable of driving the field optical deflector, the use of a single laser beam and a single processing scan can form a groove and a prepit group on one track in the first or second physical format.

In addition, in the case of a mastering apparatus having two laser beams, by changing the convergence of the spot diameter of one laser beam, in a physical format that includes a groove and prepits being in an arbitrary area, which groove and prepits have characteristics different from those of the above-described groove and prepit groups ID1, ID2, ID3, and ID4: for example, characteristics in which appropriate features cannot be obtained by only changing the power of a processing laser, highly efficient laser processing in a single process can be performed without adjusting the laser spot diameter whenever the processing area changes.

The foregoing description relates to an embodiment of the present invention, and does not mean that the present invention is limited thereto.

As described above, the present invention provides a preferable advantage in that the above-described first or second physical format can be formed by a single laser beam and a single processing scan, using laser-beam deflection by an optical deflector without using a plurality of laser beams. Moreover, by forming a method of the present invention to be a system in a mastering apparatus, a mastering apparatus having high efficiency and high productivity, without having a complicated, large optical system, can be provided.

INDUSTRIAL APPLICABILITY

A recorder according to the present invention is adapted for use as a laser cutting machine.

What is claimed is:

1. A processing method for a master disk for a land-and-groove recording rewritable optical medium having a physical format in which a groove and a land are switched for each track, prepits having track-sector information are not on spirals identical to those of said groove comprising:

performing optical deflection of a laser beam with an optical deflector using acousto-optical effects or an optical deflector using field-optical effects, said deflection of the laser beam being non-linearly formed by an analog voltage signal including a rectangular-shaped pulse wave; and performing laser processing for said groove and said prepits on one track by a single processing scan wherein said single processing scan is performed on a plurality of arbitrary points including a center of said groove and positions shifting inward and outward by a half-track pitch from said center.

2. A processing method for a master disk for a land-and-groove recording rewritable optical medium having a physical format in which a groove and a land, are switched for each track, said groove is wobbled at a frequency in a phase identical to that of an adjacent track, prepits having track sector information are not on spirals identical to those of said groove comprising:

storing a signal for the wobbling in a read-only memory;

outputting said digital data in synchronization with an original clock signal for generating a process-for-prepits signal and a process-for-groove signal;

forming a composite signal of said wobbling signal generated by performing said phase correction, and a signal for deflecting a laser beam inward and outward by a half-track pitch from the center of said groove, said signal for detecting the laser beam being non-linearly formed by an analog voltage signal including a rectangular-shaped pulse wave;

applying said composite signal to an optical deflector, using acousto-optic effects or an optical deflector using field-optic effects; and     performing laser processing for said groove and said prepits on one track by a single processing scan using optical deflection based on said composite signal wherein said signal processing scan is performed on a plurality of arbitrary points including a center of said groove and positions shifting inward and outward by half-track pitch from said center.

3. A process for producing an optical disk, comprising the steps of:

a. manufacturing a master disk for a land and groove recording rewritable optical medium having a physical format in which a groove and a land are switched for each track, and prepits having track-sector information are not on spiral identical to those of said groove, comprising the sub-steps of:

performing optical deflection of a laser beam with an optical deflector using at least one of acousto-optic effects and optical deflector using field-optical effects, said deflection of the laser beam being non-linearly formed by an analog voltage signal including a rectangular-shaped pulse wave; and         performing laser processing of said groove and said prepits on one track by a single processing scan of irradiating a master disk with said laser beam wherein said single processing scan is performed on a plurality of arbitrary points including a center of said groove and positions shifting inward and outward by a half-track pitch from said center; and     b. forming an optical disk by using said master disk.

4. A process for producing an optical disk, comprising the steps of:

a. manufacturing a master disk for a land-and-groove recording rewritable optical medium having a physical format in which a groove and a land are switched for each track, said groove is wobbled at a frequency in a phase identical to that of each adjacent track, and prepits having track-sector information are not on spirals identical to those of said groove, comprising the sub-steps of:

storing a signal for the wobbling in a memory;

outputting said signal for the wobbling in synchronization with an original clock signal for generating a process-for-prepits signal and a process-for-groove signal and providing said signal for the wobbling with phase correction;

forming a composite signal of said wobbling signal generated by performing said phase correction, and a signal for deflecting a laser beam inward and outward by a half-track pitch from the center of said groove, said signal for deflecting the laser beam being non-linearly formed by an analog voltage signal including a rectangular-shaped pulse wave;

applying said composite signal to an optical deflector using at least one of acousto-optic effects and an optical deflector, using field-optical effect, and         performing laser processing for said groove and said prepits on one track by a single processing scan using optical deflection based on said composite signal wherein said single processing scan is performed on a plurality of arbitrary points including a center of said groove and positions shifting inward and outward by a half-track pitch from said center; and     b. forming an optical disk by using said master disk.

\* \* \* \* \*